United States Patent Office 3,300,369
Patented Jan. 24, 1967

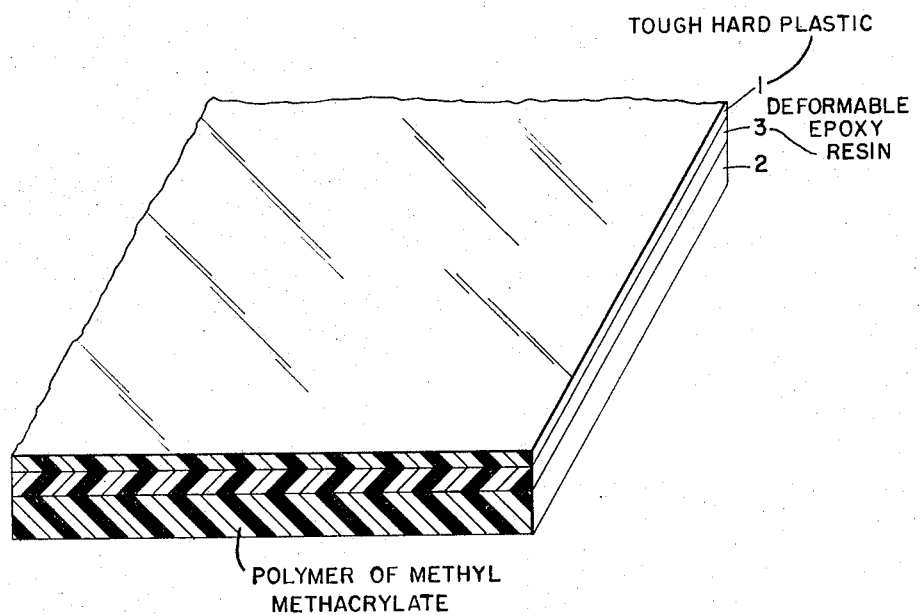

3,300,369
TRANSPARENT LAMINATES COMPRISING NON-RIGID, DEFORMABLE, THERMOSETTING, RESINOUS ADHESIVE INTERLAYERS
Ralph A. Burkley, Cuyahoga Falls, Donald C. Cully, Tallmadge, and John L. Folk, Akron, Ohio, assignors to Goodyear Aerospace Corporation, Akron, Ohio, a corporation of Delaware
Filed Mar. 27, 1963, Ser. No. 268,419
3 Claims. (Cl. 161—184)

This is a continuation-in-part application of Ralph A. Burkley et al. application Serial No. 778,414, filed December 5, 1958, now U.S. Patent No. 3,135,645.

This invention relates to multiple ply laminates and is particularly concerned with the fabrication of laminates which are resistant to thermal and structural distortion.

Multiple ply laminates have been prepared from various compositions such as various resins combined with various other structural materials for various uses. For example, it is well known in the art to use resinous rigid foam cores to adhere various skins together. The skins may be of glass, or various resins which may be further strengthened by reinforcing elements such as fiber glass. It is also known to adhere various skins together by means of various adhesives to form laminates.

These known laminates have not been completely successful for use in connection with the fabrication of high speed aircraft and missile components. Because of the high speeds encountered, elemental erosion becomes a problem which must be overcome by means of very hard rigid compositions. However, such compositions tend to shatter easily upon impact with various particles which are present in the atmosphere. Aircraft speeds above the velocity of sound cause the air immediately next to the aircraft surface to be heated as it is brought from a state of rest to the velocity of the aircraft. The magnitude of such heating is sufficient to bring about problems in cooling of aircraft components. This is particularly true in the case of aircraft enclosure components inasmuch as they have large surface areas and are customarily made of conventional transparent synthetic resin materials having relatively low heat resistance, e.g. 200° F. to 225° F. As aircraft speeds approach Mach 2, canopy surface temperatures for steady state flight may surpass the temperature limits of conventional synthetic resin canopy materials, and if it were not for the cockpit cooling system, the canopy would deform or fail under the high internal operating pressures and air loads. As aircraft speeds exceed Mach 2 and may approach Mach 3, canopy surface temperatures may reach 300–400° F. which exceeds the limits of conventional synthetic resin canopy materials and the cooling equipment requirements for steady state flight becomes so large as to render continuous flight speeds in this range impractical at the present time. In an effort to overcome the problem, various high temperature canopy materials have been developed. Unfortunately, such materials have been shown to be limited in usefulness because their impact characteristics are unsatisfactory under operational loading conditions.

It is an object of this invention to prepare laminates which are operative under extreme ranges of temperatures. It is also an object of this invention to provide laminates which are capable of withstanding extremes of structural distortion and which are capable of remaining intact when the outer layer has been deformed, or shattered. It is a further object of this invention to prepare laminates which are comprised of skins which are spaced apart by means of a deformable synthetic resin layer. It is another object of this invention to provide useful laminates by casting deformable thermosetting synthetic resins between spaced-apart skins.

The invention relates to a process for preparing laminates comprising the steps of forming a first skin comprised of a tough, hard, substantially rigid material having high temperature resistant and/or heat insulating characteristics, forming a second skin made from a stretched polymer of methylmethacrylate modified with a small amount of cross-linking agent having high shatter resistance to the same shape as said first skin, positioning said skins in adjacent substantially uniformly spaced relation, sealing said skins into a unit at the margins thereof while in spaced relation, flooding a liquid material capable of being cured by heat to form a tough, deformable, resinous layer between the skins while held in spaced relation, applying pressure to the skins to prevent distortion or separation thereof, and curing the liquid material to form a resinous intermediate layer in situ bonding said skins together, while maintaining the pressure on the skins.

In the practice of this invention, laminates are formed that comprise a tough, hard, substantially rigid first outer skin made from a material selected from the group consisting of unoriented and oriented polymers of methylmethacrylate modified with up to 2 percent of a cross-linking agent; allyl di-glycol carbonate polymers; copolymers of allyl di-glycol carbonate and methylmethacrylate; cured polyester resins comprising the products of mixtures of unsaturated alkyds made by reacting unsaturated polycarboxylic acids with polyols and cross-linking materials selected from the group of styrene, vinyl toluene, diallyl phthalate, methyl methacrylate, and triallyl cyanurate; hard, rigid, cured epoxy resins which are made by curing the resinous reaction products of epichlorohydrin and bisphenol A with curing agents selected from the group consisting of polyfunctional amines, polyfunctional amides, polycarboxylic acids, polycarboxylic acid anhydrides, and Lewis acids; highly cross-linked copolymers of methylmethacrylate and up to 20 percent of a cross-linking monomer; and a second tough, hard, substantially rigid outer skin made from a stretched, molecularly oriented polymer of methyl methacrylate modified with up to 2 percent of a cross-linking monomer, adhered together in spaced apart relationship by means of a tough, non-rigid, deformable, castable, thermosetting, resinous intermediate layer at least $\frac{1}{64}$ inch thick made in situ between said skins from one of the group of materials including those obtainable by curing flexible epoxy resins derived from cashew nut oil; flexible epoxy resins obtained by combining selected amounts of epoxy resins which are reaction products of epichlorohydrin and bisphenol A with a softening and flexibilizing additive and curing with a material from the group consisting of polyamides, polyamines, polycarboxylic acids, polycarboxylic acid anhydrides, Lewis acids and trimethoxyboroxine. Applicable softening additives may be selected from the group consisting of long chain aliphatic epoxy resins, polysulfide resins, polyamide resins, polyethylene glycols, and flexible epoxy resins derived from cashew nut oil.

The single figure of the accompanying drawings is a perspective cross-sectional view of a laminate of the invention utilizing synthetic resin skins.

In the drawing, outer skins, layers, or sheets 1 and 2 as depicted are overlaid in congruent manner and spaced apart by an intermediate layer 3. The skins 1 and 2 are of rigid synthetic resinous material as contrasted with the intermediate layer 3 which is of a flexible synthetic resinous material. Although a detailed description of the materials of the laminate of the invention follows hereinafter, it is advisable in the interests of clarity in understanding the scope of the invention to consider broadly one example of the laminate of the drawing which has useful properties; namely, an airplane canopy wherein the skin 1 is on the outer airstream side and the skin 2 is on the cockpit or inner side of the canopy. In a canopy for high-speed aircraft it is important that the canopy material be transparent, have good optical properties, be shatter-resistant and also have good resistance to the elevated temperatures, such as 300 to 400° F., of the boundary layer generated at the high air speeds prevalent in the operation of modern aircraft. Such a combination of properties is not available presently in a single resin sheet or a combination of sheets of synthetic resin materials. In making the laminate of the invention, the skin 1 may be selected from a class of synthetic resins having good temperature resistance and/or heat insulating characteristics and the skin 2 may be selected from a class of synthetic resins having shatter-proof and/or high strength properties. Combining these two skins with a resinous layer 3 results in a laminate having the desired properties.

The skins of the laminate of this invention may be the same materials, provided those skins are stretched polymers of slightly cross-linked methyl methacrylate, or different materials and will be selected in view of the use intended for the laminate. The skins must be of a tough, hard, substantially rigid composition which can be machined or molded in order to make the laminates adaptable for various uses. Also, the skins must be inherently capable of adherence with the flexible thermosetting synthetic resins which will be cast between at least two skins to form a laminate.

In canopies for high speed aircraft, the skins 1 must be transparent, abrasion resistant, and able to withstand extremes of thermal change and of structural distortion whereas the inner skins should display high strength and shatter resistance, and resist cracking. In preparing such a laminate for use in high-speed aircraft transparent enclosures, the skin 2 which will be exposed to the cockpit and will customarily be fabricated from a composition having known high strength and high crack propagation resistance properties, such as stretch oriented polymethylmethacrylate. Polymethylmethacrylate compounds, marketed in cast sheet form under the registered trademark of "Plexiglas 55" by Rohm and Haas Company, and stretch oriented to improve crazing and crack propagation resistance have proven to be useful in this regard. The outer skin 1, which will be exposed to the atmosphere, will customarily be fabricated from a composition which is resistant to temperature deformation and which may also act as an insulating layer. For example, the registered trademark product "Selectron 400," marketed by The Pittsburgh Plate Glass Company, and the trademark product "Plexiglas 55" (not stretch oriented), marketed by Rohm and Haas Company, and the trade name products "Sierracin 880" and "Sierracin 890," marketed by Sierracin Corporation, are particularly useful for this purpose. These compositions are mixtures of two or more monomers, at least one of which forms a thermoplastic when polymerized alone and at least one other of which forms a thermosetting polymer when polymerized alone, e.g., mixtures of styrene, or vinyl toluene, with maleic anhydride glycerol polyesters. Thus, it is obvious that tailor-made laminates, suitable for particular uses, may be fabricated by spacing apart, by means of a layer of flexible resin, various skins having particular properties.

More specifically, the first outer skin 1 can be made from a material selected from the group of materials of unoriented and oriented polymers of methylmethacrylate modified with up to 2 percent of a cross-linking agent from the group of glycidyl methacrylate, ethylene glycol dimethacrylate, tetra-ethylene glycol dimethacrylate and allyl methacrylate; allyl di-glycol carbonate polymers; copolymers of allyl di-glycol carbonate and methyl methacrylate; cured polyester resins comprising the products of mixtures of unsaturated alkyds made by reacting unsaturated polycarboxylic acids and/or unsaturated polycarboxylic acid anhydrides with polyols and cross-linking materials selected from the group of styrene, vinyl toluene, diallyl phthalate, methyl methacrylate, and triallyl cyanurate; hard, rigid, cured epoxy resins which are made by curing the resinous reaction products of epichlorhydrin and bisphenol A with curing agents selected from the group consisting of polyfunctional amines, polycarboxylic acids and polycarboxylic acid anhydrides, Lewis acids which include borontrifluoride and organic complexes thereof with polyamines, and trimethoxyboroxine; and highly cross-linked copolymers of methylmethacrylate and up to 20 percent of a cross-linking monomer selected from the group of glycidyl methacrylate, ethylene glycol dimethacrylate, tetra-ethylene glycol dimethacrylate and allyl methacrylate.

The second tough, hard, substantially rigid outer skin 2 is preferably made from a stretched, molecularly oriented polymer of methyl methacrylate modified with up to 2 percent of a cross-linking monomer selected from the group of glycidyl methacrylate, ethylene glycol dimethacrylate, tetra-ethylene glycol dimethacrylate and allyl methacrylate.

The intermediate layer 3 may be selected from any castable thermosetting synthetic resin, as described herein. Such resins may cure at room temperature, but are usually cured at elevated temperatures which are usually kept below 235° F. The resins must be capable of curing to a tough, non-rigid, deformable, resinous layer and must readily adhere to any of the various skin compositions. These intermediate layer resins may be selected from various resins which remain flexible after being cured, such as long chain aliphatic epoxy resins, mixtures of aliphatic epoxy resins and epichlorhydrin-bisphenol A epoxies, polyamide modified epoxy resins, polysulfide modified epoxy resins, and polyethylene glycol modified epoxy resins.

Representative polyhydric alcohols which can be used in preparing alkyd resins for use in the practice of this invention are ethylene glycol, triethylene glycol, propylene glycol, 1,4-butene diol, dipropylene glycol, hexamethylene glycol, pinacol and glycerol. Representative polycarboxylic acids which can be used in preparing alkyd resins by reaction with any of the above-mentioned polyhydric alcohols and others are phthalic, isophthalic, terephthalic, succinic, adipic, sebacic, maleic, fumaric, 2-phenylglutaric, citric, citraconic, mesaconic, itaconic, oxalic, malonic, glutaric, pimelic, suberic, azelaic, and sebacic acids. Adaptable acid and alcohol combinations will include at least one unsaturated acid, or alcohol, in the mixture. It is also possible to substitute ester-forming derivatives, such as the anhydrides, the simple esters and the like for the acids themselves. Also, certain monofunctional modifiers can be incorporated in the resin according to the known art.

Epoxy resins which may be modified so as to remain flexible after curing may be described as the reaction products of polyphenolic compounds and epoxy compounds such as epichlorohydrin. Cross-linking forms the thermosetting polymers. Polymerization is normally induced by means of organic polyamines. Such epoxy resins may be further modified with small amounts of various other types of resins such as urea-formaldehyde, phenol-formaldehyde and melamine-formaldehyde, or they may be esterified with various fatty acids and vegetable oil acids. Particularly useful epoxy resins may be described as linear polymers obtained as reaction products of epichlorhydrin and bisphenol A. Another group of useful epoxy resins are derived from reacting ethylenically unsaturated aromatic hydrocarbons and halo-substituted hydrocarbons with peracetic acid, perbenzoic acid, monoperphthalic acids, etc. Physical characteristics, whether liquid or solid, are determined by the degree of polymerization or average molecular weight. These epoxy resins may be prepared commercially or extracted from cashew nut oil. The epoxy resins derived from cashew nut oil, when cured, are flexible without modification. Epoxy resins derived from epichlorohydrin and bisphenol A yield essentially rigid products when reacted with curing agents, such as polyfunctional aliphatic or aromatic amines, polycarboxylic acids or their acid anhydrides. A certain degree of flexibility and toughness is obtained by curing these epoxy resins with polyamides, such as the registered trademark products "Versamide 125" and "Versamide 140," marketed by General Mills, Inc. of the U.S.A. These epoxy resins derived from epichlorohydrin and bisphenol A can be flexibilized further by modifying them before curing with high percentages of softening additives, such as at least about 33% to 50% of a polysulfide and the remainder epoxy resin, or at least about 50% to 65% of a polyamide and the remainder resin, or of about 20% to 50% of a polyalkylene glycol and the remainder resin or of about 33% to 70% of a long chain aliphatic epoxy resin. They can also be flexibilized by blending with the epoxy resin extracted from cashew nut oil. Examples of polysulfides are the registered trademark products of "Thiokol" LP 2, LP 3, LP 8, and LP 33, marketed by Thiokol Corporation. An example of flexible cashew nut oil epoxy resin is the trade name product "Cardolite NC 513," marketed by Irvington Varnish Company. An example of long chain aliphatic epoxy resin is Dow Chemical DER–732. Polyethylene glycols with molecular weights of 600 to 6000 are applicable examples of polyalkylene additives. These epoxy resins, after being modified as described above, can be cured to form a tough, flexible intermediate layer with polyamine curing agents, such as diethylene triamine, metaphenylene diamine, diethylamine propylamine, N-aminoethyl piperazine, etc., or with dicarboxylic acid anhydrides, such as phthalic anhydride, hexabydrophthic anhydride, maleic anhydride, methyl malic anhydride, pyromellitic dianhydride, etc. Polyamide flexibilized epoxy resins may be cured without additional curing agents or curing agents, preferably polyamines, may be used. Polysulfide modified epoxy resins are most effectively cured with polyamine type curing agents and tri-dimethylaminomethylphenol and tetraethylene pentamine are particularly useful in this regard. Rigid epoxy resins flexibilized with cashew nut oil epoxy resins or long chain aliphatic epoxy resins are conveniently cured with polyamines but are also curable with dicarboxylic acid anhydrides. Epoxy resins flexibilized with polyalkylene glycol additives must be hardened with dicarboxylic acid anhydrides.

A particular family of flexible, deformable, castable epoxy resins used in making the intermediate layer 3, may also be defined as the cured products of resinous mixtures comprised of 0 to 50 percent of the reaction products of epichlorohydrin and bisphenol A (epoxide equivalent weights of about 170 to about 275), and about 50 to 100 percent by weight of straight-chain aliphatic diglycidyl ethers (epoxide equivalents of weights about 190 to about 400) cured with about 85 to about 100 percent of stoichiometric amounts of materials selected from the class referred to as polyfunctional amines, polybasic acids and anhydrides or with about 1 percent to about 5 percent of materials selected from the class referred to as Lewis acids which include boron trifluoride and organic complexes thereof, and trimethoxyboroxine.

The laminates of this invention will include at least three components including at least two outer skins and at least one intermediate layer. Also, a multiplicity of plies may be used to perform various functions. In preparing the laminates, each outer ply, or skin, like the skins 1 and 2 must be separated from the adjacent ply by means of at least one of the described flexible intermediate layers.

The exterior skins 1 and 2 may be of any desired thickness. For example, the skins may be as thin as 1/64 inch and may be as thick as 1/2 inch or more. The thickness of the outer skin 1 will depend upon the use for the laminate. The inner or opposite skin 2 may also range in thickness from very thin, e.g. 1/64 inch, to reasonably thick compositions, e.g. 1/2 inch or more. This is particularly true in the fabrication of aircraft parts where the outer skin 1 must withstand thermal distortion and elemental erosion. The thickness of the flexible resin intermediate layer is quite critical. It must be substantially thicker than a mere adhesive. For example, the intermediate layer 3 should be at least 1/64 inch thick in order to withstand the thermal distortion created by changes in the temperature of the laminate and may be as thick as 3/4 of an inch. Preferably, the intermediate layer should be from 1/16 inch to 1/4 inch thick.

The laminates of this invention are prepared by fabricating the skins in any known manner. For example, skins may be shaped to desired form from previously prepared materials such as various synthetic resins described herein by heating them and shaping them to a form. Such skins may also be prepared by modling in a customary mold at customary molding temperatures. In preparing the laminates, the prepared and/or contoured skins are held in spaced-apart relationship by means of various spacers or gaskets which maintain a cavity between the skins which is equivalent in depth to the desired thickness of the intermediate layer. The spacers should be inert to the casting resin and may be made from such materials as a synthetic resin coated metal, polytetrafluorethylene, silicone rubber, and extruded nylon. Thereafter, the fluidized thermosetting casting resin to be used is poured or forced into the cavity between the skins after which the laminate assembly is sealed and the intermediate layer 3 is cured in situ.

One preferred procedure of filling the cavity is to vertically suspend the spaced-apart, spacer-sealed sandwich with the surface plane of the skins in a plane substantially normal to earth horizontal. A vent opening is provided at the midpoint of the top spacer and an inlet opening near the bottom of the cavity, e.g., in the bottom spacer. The viscous flowable resinous inner layer material is then slowly injected in the inlet and the cavity filled from the bottom upward until the resinous material begins to fill the top vent. Such procedure, referred to as flooding, results in an easily controllable casting procedure giving a void-free interposed layer.

Curing may be effected at room temperature, e.g., 70° F., but customarily the curing temperatures will be elevated but maintained below about 235° F., since at least the inner skin of the laminate is an oriented acrylic material. This temperature control is necessary to prevent thermal relaxation in oriented acrylic skins, or layers.

The conditions of curing, e.g., time, temperature and pressure, are known in the art and will depend on the resins being cured. Normally, the temperature will be between room temperature and 235° F., the time between a few minutes, e.g., 10 minutes and several hours, e.g., 72 hours, and the gauge pressure will range between none and 25 pounds per square inch.

The following examples are used to illustrate the invention and are not intended to limit the scope of the invention.

While certain examples of Lewis acids and organic complexes thereof have been given for producing hard, rigid, cured epoxy resins, other examples of such acids are borontrifluoride dihydrate, and organic complexes of borontrifluoride with ethers, with nitrogen containing compounds, with oxygen containing compounds, and with phenols, and any such Lewis acids may be used in making flexible epoxy resins.

Example 1

A 12″ by 12″ flat panel laminate was made in the following manner. The outer skin 1 was cut from a sheet of a stretched material identified by the registered trademark "Plexiglas–55," which was 0.350 inch thick. While the registered trademark product "Plexiglas" is generally classed as a polymer of methyl methacrylate, it is a polymer of methylmethacrylate modified with a small amount, usually less than 2 percent by weight, of a cross-linking monomer. When the word "stretched" is used in describing the product "Plexiglas," or to equivalent methylmethacrylate polymers, such term means that a sheet of the material has been cast and then preheated to a temperature of at least 250° F., or higher and then it is stretched 60 to 75 percent multiaxially so as to orient the molecules in the sheet. The sheet is cooled rapidly while retained in the stretched condition. The inner skin 2 was cut from a sheet of the trade name product "Sierracin 880" (a cross-linked polymeric material made from a mixture of styrene and polyester obtained by reacting an unsaturated dibasic acid such as maleic or fumaric with a glycol such as ethylene glycol or propylene glycol) which was 0.125 inch thick. The outer and inner skins were cleaned and held in spaced-apart relation by means of a bronze welding rod coated with a silicone rubber. This spacer was bent about the periphery of the skins. Around the edge of the silicone rubber, a commercial bag-sealing compound was used to insure the seal. This assembly was taped together by means of a plasticized cellulose tape. The skins were reinforced by means of aluminum plates 0.250 inch thick and the entire assembly was held together by means of C-clamps. The assembly was placed in a vertical position with an unsealed edge at the top. The vertical edges were clamped together with 15-pound spring clamps positioned side by side. The interlayer casting resin was made from a mixture of 300 grams of a product DER–332 (a fluidized epoxy resin), with 300 grams of the registered trademark product "Thiokol" LP–8 (which are long chain polymers with mercaptan end groups). Prior to mixing, the epoxy and polysulfide resins were warmed separately for three and one-half hours at 150° F. Thereafter, the resins and diethylene triamine were blended together and flooded into the cavity to form the intermediate layer 3. The entire assembly was cured for 18 hours at room temperature followed by 2½ hours in a circulating air oven at 150° F. Thereafter, the panel assembly was removed from the oven, the clamps removed, and the panel tested. The finished panel was substantially transparent but had a slight yellow discoloration. The panel displayed excellent optical qualities with no distortion and the panel contained no observable imperfections. A specimen was cut from the panel and tested for adhesion. It was found that the skin layers would fracture before they would separate.

Example 2

An electrically heated all plastic windshield assembly, complete with electrically conductive transparent coating, bus bars, connecting wires, temperature sensing element and terminal blocks was fabricated and electrically, structurally, and optically examined. This windshield incorporated an outer shell, or skin 1 of 0.080 inch thickness CR–39M, a copolymer of allyl di-glycol carbonate and methyl methacrylate, largely the former, marketed in cast sheet form by Cast Optics Corporation. The inner shell, or skin 2 was 0.50 inch thickness stretched Plexiglas 55, a polymer of methyl methacrylate modified with a small amount of a cross-linking agent, marketed in cast sheet form by Rohm and Haas Company and stretch oriented to about 65 to about 75 percent under favorable conditions of temperature and pressure as part of the windshield fabrication procedure. The intermediate layer 3 was 0.150 inch thickness flexible, deformable epoxy interlayer which was cast in situ between the spaced apart shells 1 and 2. This epoxy intermediate layer 3 was cast using an epoxy resin mixture formulated from 45 parts by weight DER–332, a di-glycidyl ether of bisphenol A type epoxy resin having an epoxide equivalent weight of about 179, 55 parts by weight DER–732, a straight chain diglycidyl ether having an epoxide equivalent weight of about 330, both of which are marketed by Dow Chemical Company, and 19 parts by weight N-aminoethyl piperazine.

In the manufacture of this windshield, the CR–39M and stretch Plexiglas 55 shells were formed to the desired curvature under the influence of convenient time, temperature and pressure cycles. The CR–39M was then equipped with Liberty Mirror 81–E electrically conductive transparent coating and suitable bus bars and connecting wires. The 81–E electrically conductive transparent coating is the type described in U.S. Patent No. 3,020,376 and was vacuum deposited on the inner surface of the preformed CR–39M outer shell. Suitable bus bars were also located and vacuum deposited on the CR–39M shell inner surface and suitable connecting wires were attached to the bus bars with highly conductive silver-filled adhesive. The thin, preformed CR–39M outer shell, thus equipped with an electrically conductive transparent coating, bus bars, and connecting wires, was drawn with vacuum against a slightly oversize reinforcing structure of similar curvature and irregular shape, which contacted its outer surface. Following this, a temperature sensing element, which is used to electrically control the temperature of the transparent electrically conductive coating, was adhered to the vacuum deposited coating surface. This assembly was then assembled with the stretched Plexiglas 55 inner shell 2, which had been preformed to similar curvature and trimmed to similar irregular shape, and a 0.150 inch thickness plasticized polyvinyl chloride gasket with essentially rectangular cross section and about 0.750 inch wide. The gasket was positioned around the periphery of the stretched Plexiglas 55 and electrically conductive CR–39M shells and the assembly was clamped together with suitable spring clamps. The flexible epoxy interlayer resin, prepared as described above, was then introduced into the space between the outer shell 1 and the inner shell 2, confined by the peripheral gasket, through a suitable opening in the stretched Plexiglas 55 inner shell using a pressure of about 5 p.s.i. in addition to gravity influence, and air from the space being filled with resin was allowed to escape through a similar opening in the stretched Plexiglas 55 shell. When the cavity or space between the two shells was completely filled with resin, the two openings in the stretched Plexiglas 55 inner shell were hermetically sealed and the flexible epoxy interlayer resin was cured in situ to a deformable, tough, transparent layer which was securely adhered to the stretched Plexiglas 55 inner surface and to the electrically conductive 81–E transparent coating on the inner surface of the CR–39M. The windshield assembly described above, after being equipped with suitable terminal blocks and after being trimmed to the desired size, which eliminated the inner and outer shell areas encompassing the plasticized polyvinyl chloride gasket, was visually inspected and found to be optically acceptable for numerous windscreen applications. It was also tested electrically and found to be capable of de-icing and defogging in a Dry Ice chamber.

Example 3

A test panel was constructed according to the procedure of Example 1. The inner skin 2 was cut from a sheet of stretched polymethylmethacrylate ("Plexiglas–55") which was 0.350 inch thick. The outer skin was cut from a sheet of a polyester resin made from an unsaturated dibasic acid such as maleic acid and a glycol such as propylene glycol polymerized with a monomer such as divinyl benzene available under the trade name of "Sierracin 880" which was 0.125 inch thick. The flexible resinous intermediate layer was comprised of a mixture of 50 percent by weight of an epoxy resin known under the trade name of "Epirez 504" and 50 percent by weight of a liquid long chain polymer with mercaptan end groups, the registered trademark product of "Thiokol LP 8". The resin mixture contained 10 percent by weight of diethylene triamine as a curing agent. The intermediate layer 3 was cast to a thickness of 0.10 inch. The panel was cured at 150° F. for a period of 18 hours. The finished laminate was a pale yellow, transparent laminate which displayed excellent adhesion between the skins and had excellent optical transmission properties.

The following examples are intended to further illustrate the invention and are not intended as limitations thereon. The examples illustrated in the tables were in the nature of test panels about 4″ x 4″ square. The indicated skin compositions were prepared in a customary manner and were usually cut from commercial sheets. The interior faces of the skins 1 and 2 were cleaned by washing with detergents and/or solvents. Obviously, a cleaning composition must be selected which will not attack the skin being cleaned. Thereafter, spacers or gaskets were inserted between the previously prepared skins and the assembly clamped together. The gasketing material was selected from materials which were inert to the intermediate casting resins. The following spacer materials were used in one or more of the test samples: Polytetrafluoroethylene, silicone rubber, polyethylene, extruded nylon, and synthetic resin coated steel spacers. If a substantially air-tight seal was not created by the gaskets, a sealing compound was used to make the assembly air-tight, leaving only a small opening for insertion of the intermediate layer casting resin. The assemblies were put under slight pressure by means of the clamps in order to prevent leakage around the gaskets, to maintain uniform intermediate layer thickness throughout the laminated panel, to keep the intermediate layer and outer skins or shells in intimate contact throughout the curing cycle, and to compensate for shrinkage of the resin intermediate layer. In fabricating larger articles, pressure is maintained by compressed air, fluid pressure, vacuum applied to the interior of articles and/or spring tension. After the panel assemblies had been prepared, the intermediate layer casting resins were mixed and transferred into the cavities. Customarily, the mixed resin was exposed to a vacuum prior to being inserted between the skins in order to remove any occluded or dissolved air. Also, a vacuum is frequently used to remove any residual air after the resins have been poured into the panel assemblies. Transfer of the resins into the cavity between the outer skins was accomplished by pouring, flooding, or by pressure injection. Thereafter, the panel assemblies were cured by heating in an oven as indicated in the tables.

TABLE NO. 1

| Example | Inner Skin 2 Thickness, Inch | Outer Skin 1 Material | Thickness, Inch | Color | Degree of Adhesion | Remarks |
|---|---|---|---|---|---|---|
| 4 | 0.250 | Sierracin 880 | 0.125 | Pale yellow | Excellent | Optically transparent. |
| 5 | 0.250 | Sierracin 890 | 0.250 | Yellow | ___do___ | Do. |
| 6 | 0.350 | Stretched Sierracin RC 500 | 0.125 | Pale yellow | ___do___ | Do. |
| 7 | 0.250 | "Selectron 400" | 0.250 | Yellow | ___do___ | Do. |

NOTE.—On all the above laminates, the inner skin was stretched "Plexiglas 55" and the intermediate layer was "Dow DER X" 2640.2 having a thickness of 0.100 inch. Diethylene Triamine (10%) was the curing agent and the laminates were all cured at 150 degrees Fahrenheit for 65 hours.

TABLE NO. 2

| Example | Inner Skin 2 Thickness, Inch | Outer Skin 1 Material | Thickness, Inch | Color | Degree of Adhesion | Remarks |
|---|---|---|---|---|---|---|
| 8 | 0.350 | Sierracin 880 | 0.125 | Pale brown | Excellent | Optically transparent. |
| 9 | 0.250 | Sierracin 890 | 0.250 | ___do___ | ___do___ | Do. |
| 10 | 0.350 | Stretched Sierracin RC 500 | 0.125 | ___do___ | ___do___ | Do. |
| 11 | 0.250 | "Selectron 400" | 0.250 | Yellowish brown | ___do___ | Do. |

NOTE.—On all the above laminates, the inner skin 2 was stretched "Plexiglas 55" and the intermediate layer was 50% "Dow DER 332" mixed with 50% "Thiokol" LP-8 having a thickness of 0.100 inch. Diethylene Triamine (5%) was the curing agent and the laminates were all cured at 150 degrees Fahrenheit for 16 hours.

TABLE NO. 3

| Example | Inner Skin 2 Thickness, Inch | Outer Skin 1 Material | Thickness, Inch | Color | Degree of Adhesion | Remarks |
|---|---|---|---|---|---|---|
| 12 | 0.350 | Sierracin 880 | 0.125 | Yellow | Excellent | Optically transparent. |
| 13 | 0.250 | Sierracin 890 | 0.250 | ___do___ | ___do___ | Do. |
| 14 | 0.350 | Stretched Sierracin RC 500 | 0.125 | ___do___ | ___do___ | Do. |
| 15 | 0.250 | "Selectron 400" | 0.250 | ___do___ | ___do___ | Do. |

NOTE.—On all the above laminates, the inner skin 2 was stretched "Plexiglas 55" and the intermediate layer 3 was 50% "Dow DER 332" mixed with 50% "Versamide 140" having a thickness of 0.100 inch. No curing agent was used and the laminates were all cured at 150 degrees Fahrenheit for 65 hours.

The trademarked materials used in examples illustrated in Tables 1 through 3, which are not previously described, may be defined in the following manner. Registered trademark "Dow DER X–2640.2" is a long chain aliphatic flexible epoxy resin with an epoxide equivalent of 210. The registered trademark product Dow DER–332 is a liquid epoxy resin derived from bisphenol A and epichlorhydrin with an epoxide equivalent weight of 179. Dow DER–732 is a straight-chain aliphatic diglycidyl ether with an epoxide equivalent weight of 330. Registered trademark Versamides 125 and 140, marketed by General Mills are produced under U.S. Patent No. 2,379,413. Reaction products of Versamides and standard epichlorhydrin-bisphenol A epoxy resins, like the materials used as interlayers in Examples 12, 13, 14 and 15 are described in U.S. Patent No. 2,705,223. Registered trademark Thiokol LP–2, LP–3, LP–8, LP–33, LP–205, etc., which are useful polysulfide flexibilizers for epoxy resins are liquid condensation products of alkaline polysulfides, such as sodium tetrasulfide ($Na_2S_4$), and suitable dihalides, for example, ethylene dichloride

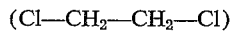

with thiol end groups, which are taught in U.S. Patent No. 2,466,963. For example, Thiokol LP–8 is a liquid polythiodithiol polymer of molecular weight 500–700 prepared from 98 mole percent of bis (2-chloroethyl) formal and 2 mole percent of trichloro-propane. Thiokol LP–33 is a liquid polythiodithiol, having a molecular weight of approximately 1000, prepared from 99.5 mole percent of bis (2-chloroethyl) formal and 0.5 mole percent of trichloropropane. "Sierracin RC–500" and "Plexiglas II" are rigid polymethylmethacrylate resins.

In preparing the laminates of this invention, the various resins may be modified in accordance with procedures known in the art. For example, curing agents such as the various organic peroxides and polyamines may be added, accelerators such as the various sulfenamides, thiocarbonates and disulfides may be added and bleaching agents such as the inorganic peroxides may be added to the flexible casting resins, if desired. Also, the various resins used to fabricate the skins or the interlayers may be homogeneous compositions or the skins may be cross-linked polymeric materials or copolymers made from mixtures of one or more of the various described resins. In addition, the various resins may be reinforced in any customary manner, for example, by glass fibers, wire mesh, etc. Also, the interior skin surfaces may be coated with various materials to improve adhesion although this is customarily avoided. The skin surfaces, particularly the inner skin surfaces, may be coated with a thin, molecular thickness, conductive coating, preferably a powdered metal which is deposited by the well known process of vaporizing the metal in a vacuum and depositing it on the surface as by means of electrical forces. When the inner surface is coated with powdered metal, it is electrically conductive and it may be desirable to protect the deposited metal coating with a thin coating of a resin such as the silanes, epoxy resins, polyester resins or polymethylmethacrylate resins. Suitable connectors, as described hereinbefore are attached to such electrically conductive layer.

Although the invention has been described in connection with aircraft and missile components, it is applicable to a wide variety of uses such as shock mounts, decorative laminates, and puncture sealing container liners.

While a certain representative embodiment and details have been shown for the purpose of illustrating the invention, it will be apparent to those skilled in this art that various changes and modifications may be made therein without departing from the spirit or scope of the invention.

What we claim is:

1. A transparent laminate comprising a tough, hard, substantially rigid first outer skin made from a material (A) selected from the group of polymers of methylmethacrylate modified with up to 2 percent of a cross-linking agent and which polymers may be oriented; allyl di-glycol carbonate polymers; copolymers of allyl di-glycol carbonate and acrylic monomers; cured polyester resins consisting of the products of mixtures of unsaturated alkyds made by reacting unsaturated polycarboxylic acids with polyols and cross-linking materials selected from the group of styrene, vinyl toluene, diallyl phthalate, methyl methacrylate, and triallyl cyanurate; hard, rigid, cured epoxy resins which are made by curing the resinous reaction products of epichlorhydrin and bisphenol A with curing agents selected from the group consisting of polyfunctional amines, polyfunctional amides, polycarboxylic acids, polycarboxylic acid anhydrides, and Lewis acids; highly cross-linked copolymers of methylmethacrylate and up to 20 percent of a cross-linking monomer; and (B) a second tough, hard substantially rigid outer skin made from a stretched, molecularly oriented polymer of methyl methacrylate modified with up to 2 percent of a cross-linking monomer adhered together in spaced apart relationship by means of (C) a tough, non-rigid, deformable, castable, thermosetting, resinous intermediate layer at least 1/64 inch thick made in situ between said skins from one of the group of materials including cured flexible epoxy resins derived from cashew nut oil; the flexible epoxy resin obtained as the reaction product of epichlorhydrin and bisphenol A cured with a material from the group of polyamides, polyamines, Lewis acids and polycarboxylic acids and their anhydrides and including a softening additive; and mixtures of said flexible epoxy resins.

2. A laminate as in claim 1 wherein said Lewis acids include borontrifluoride, trimethoxyboroxine, borontrifluoride dihydrate, and organic complexes of borontrifluoride with a material from the group consisting of polyamines, ethers, nitrogen containing compounds, oxygen containing compounds, and phenols; and where said softening additive is selected from the group of polysulfides, polyamides, polyethylene glycols, and long chain aliphatic epoxy resins.

3. A laminate as in claim 1 where said intermediate layer is the cured product of resinous mixtures comprised of 0 to 50 percent of the reaction products of epichlorhydrin and bisphenol A (epoxide equivalent weights of about 170 to about 275); and 50 to 100 percent by weight of straight-chain aliphatic diglycidyl ethers (epoxide equivalents of weights about 190 to about 400) cured with about 85 to about 100 percent of the stoichiometric amounts of material selected from the group of polyfunctional amines, polybasic acids and polybasic anhydrides or with about one percent to about 5 percent of a Lewis acid material.

References Cited by the Examiner

UNITED STATES PATENTS

| | | | |
|---|---|---|---|
| 2,594,229 | 4/1952 | Snyder et al. | 156—163 X |
| 3,135,645 | 6/1964 | Burkley et al. | 161—165 |
| 3,156,580 | 11/1964 | Howard | 117—75 |
| 3,256,135 | 6/1966 | Weinheimer et al. | 156—330 X |

EARL M. BERGERT, *Primary Examiner.*

HAROLD ANSHER, *Examiner.*